United States Patent
Sherman

(10) Patent No.: US 7,468,954 B2
(45) Date of Patent: Dec. 23, 2008

(54) MOBILE AD-HOC NETWORK PROVIDING EXPEDITED CONGLOMERATED BROADCAST MESSAGE REPLY FEATURES AND RELATED METHODS

(75) Inventor: Stephen Guy Sherman, Fairport, NY (US)

(73) Assignee: Harris Corporation, Melbourne, FL (US)

( * ) Notice: Subject to any disclaimer, the term of this patent is extended or adjusted under 35 U.S.C. 154(b) by 732 days.

(21) Appl. No.: 11/011,524

(22) Filed: Dec. 14, 2004

(65) Prior Publication Data

US 2006/0126535 A1   Jun. 15, 2006

(51) Int. Cl.
*H04L 12/28* (2006.01)
*H04L 12/56* (2006.01)
*H04J 15/00* (2006.01)
*H04J 3/08* (2006.01)

(52) U.S. Cl. ............... 370/254; 370/312; 370/315; 370/390; 370/392; 370/465

(58) Field of Classification Search ................. None
See application file for complete search history.

(56) References Cited

U.S. PATENT DOCUMENTS

| | | | | |
|---|---|---|---|---|
| 5,412,654 | A | 5/1995 | Perkins | 370/94.1 |
| 6,304,556 | B1 | 10/2001 | Haas | 370/254 |
| 6,816,903 | B1 * | 11/2004 | Rakoshitz et al. | 709/226 |
| 7,184,421 | B1 * | 2/2007 | Liu et al. | 370/338 |
| 7,218,608 | B1 * | 5/2007 | Fang et al. | 370/229 |
| 7,280,505 | B2 * | 10/2007 | Chaskar et al. | 370/331 |
| 2001/0034853 | A1 * | 10/2001 | Takatama et al. | 714/4 |
| 2005/0078678 | A1 * | 4/2005 | Kim et al. | 370/390 |
| 2005/0129005 | A1 * | 6/2005 | Srikrishna et al. | 370/356 |
| 2005/0176445 | A1 * | 8/2005 | Qu et al. | 455/458 |
| 2006/0117113 | A1 * | 6/2006 | Elliott et al. | 709/239 |

OTHER PUBLICATIONS

Kunito et al., *An Ad-hoc Routing Control Method in Sensor Networks*, 2000 IEEE.
Clausen et al., *Optimized Link State Routing Protocol*, IETF Manet Working Group, Internet Draft, Oct. 2003.

* cited by examiner

*Primary Examiner*—Ronald Abelson
(74) *Attorney, Agent, or Firm*—Allen Dyer Doppelt Milbrath & Gilchrist

(57) ABSTRACT

A MANET may include a plurality of mobile nodes and wireless communications links therebetween. A given mobile node along a route in the MANET may be for receiving a broadcast message inviting replies from mobile nodes along the route, forwarding the broadcast message to at least one downstream mobile node along the route, and waiting for the at least one downstream mobile node to reply based upon the forwarded broadcast message. Moreover, the given mobile node may also send a reply to the broadcast message at the earlier of either the least one downstream mobile node sending a reply to the forwarded broadcast message or a given reply time expiring.

38 Claims, 4 Drawing Sheets

MOBILE AD-HOC NETWORK PROVIDING EXPEDITED CONGLOMERATED BROADCAST MESSAGE REPLY FEATURES AND RELATED METHODS

GOVERNMENT LICENSE RIGHTS

The U.S. Government has a paid-up license in this invention and the right in limited circumstances to require the patent owner to license others on reasonable terms as provided for by the terms of contract No. DAAE30-96-C-0019, awarded by the Department of the Army.

FIELD OF THE INVENTION

The present invention relates to the field of communications systems, and, more particularly, to mobile ad-hoc networks and related methods.

BACKGROUND OF THE INVENTION

Wireless networks have experienced increased development in the past decade. One of the most rapidly developing areas is mobile ad-hoc networks (MANETs). Physically, a MANET includes a number of geographically distributed, potentially mobile nodes sharing one or more common radio channels. Compared with other types of networks, such as cellular networks or satellite networks, the most distinctive feature of MANETS is the lack of any fixed infrastructure. The network is formed of mobile (and potentially stationary) nodes, and is created on the fly as the nodes communicate with each other. The network does not depend on a particular node and dynamically adjusts as some nodes join or others leave the network.

As wireless communication increasingly permeates everyday life, new applications for MANETs will continue to emerge and become an important factor in wireless communications. Yet, MANETs pose serious challenges to designers. Due to the lack of a fixed infrastructure, nodes may have to self-organize and reconfigure as they move, join or leave the network. Further, there may be no natural hierarchy or central controller in the network. Thus, many functions which are centralized in other types of networks have to be distributed among nodes in a MANET.

Furthermore, mobile nodes are often powered by batteries and have limited communication and computation capabilities. In addition, the distance between nodes will often exceed the nodes' radio transmission range, and transmissions may thus have to be relayed by other nodes before reaching their destination. Consequently, a MANET network typically has a multi-hop topology, and this topology changes as the nodes move around.

The MANET working group of the Internet Engineering Task Force (IETF) has been actively evaluating and standardizing routing protocols, including multicasting protocols. Because the network topology changes arbitrarily as the nodes move, information is subject to becoming obsolete, and different nodes often have different views of the network, both in time (i.e., information may be outdated at some nodes but current at others) and in space (i.e., a node may only know the network topology in its neighborhood and not far away from itself).

MANET routing protocols thus need to adapt to frequent topology changes, possibly with less than accurate information. Because of these unique requirements, routing in MANETs is very different than in other networks. Gathering fresh information about the entire network is often costly and impractical. Thus, some routing protocols are reactive (i.e., on-demand) protocols. That is, they collect routing information only when necessary and only to destinations to which they need routes, and do not maintain unused routes. In this way the routing overhead may be reduced compared to proactive protocols, which maintain optimal routes to all destinations at all times. Ad Hoc on Demand Distance Vector (AODV), Dynamic Source Routing (DSR) and Temporally Ordered Routing Algorithm (TORA) are examples of reactive routing protocols presented at the MANET working group.

An example of a proactive routing protocol is found in Clausen et al. entitled "Optimized Link State Routing Protocol," IETF MANET Working Group, Internet Draft, October 2003. Examples of other various routing protocols include Destination Sequenced Distance-Vector (DSDV) routing, which is disclosed in U.S. Pat. No. 5,412,654 to Perkins, and the Zone Routing Protocol (ZRP), which is disclosed in U.S. Pat. No. 6,304,556 to Haas. ZRP is a hybrid protocol using both proactive and reactive approaches.

In command/control MANET applications where messages are relayed back and forth to a command/control platform or node, an imbalance in the workload typically results. This is because nodes closer to the command/control platform have the added burden of routing messages between outlying or downstream nodes and the command/control platform, as well as handling their own messages. During a network application broadcast that requires a respective reply from each mobile node in the network, this burden may become excessive for nodes close to the command/control platform. As a result, significant battery drain and bandwidth usage may result.

One approach to address this problem is set forth in an article by Kunito et al. entitled "An Ad-hoc Routing Control Method in Sensor Networks." This article proposes a new MANET routing protocol called Integrated Source Routing in Ad-hoc Networks with Adaptive Construction (ISAAC). The purpose of the proposed protocol is to reduce the number of control packets that are transmitted during route discovery, particularly over the links nearest to the requesting or source node. To do so, routing response control packets are "integrated" as they propagate back toward the source node and are sent together along the next hop to the source node. To integrate the response packets, each intermediate node waits a time t, and at the end of this time the intermediate node forwards the information it has collected from other nodes during this period. The time that an intermediate node waits is based in part upon a maximum hop count of the route from source to destination node, and the hop count between the source node and the intermediate node.

One potential drawback of such an approach is that each intermediate node has to wait long enough to allow outlying nodes a chance to receive the control packet and generate a response thereto. However, response times may vary significantly based upon network usage and other factors. Thus, to be effective the intermediate node would need to wait for the maximum expected time it could take outlying nodes to respond assuming worse-case response delays. Yet, imposing such response delays may significantly increase the time required to complete a broadcast message reply sequence, which may not be desirable in certain applications.

SUMMARY OF THE INVENTION

In view of the foregoing background, it is therefore an object of the present invention to provide a mobile ad-hoc network (MANET) with expedited broadcast message reply features and related methods.

This and other objects, features, and advantages in accordance with the present invention are provided by a MANET which may include a plurality of mobile nodes and wireless communications links therebetween. A given mobile node along a route in the MANET may be for receiving a broadcast message inviting replies from mobile nodes along the route, forwarding the broadcast message to at least one downstream mobile node along the route, and waiting for the at least one downstream mobile node to reply based upon the forwarded broadcast message. Moreover, the given mobile node may also send a reply to the broadcast message at the earlier of either the least one downstream mobile node sending a reply to the forwarded broadcast message or a given reply time expiring.

More particularly, the reply from the given mobile node may be a conglomerated reply if the given mobile node has received the reply from the at least one downstream mobile node. Accordingly, the given mobile node advantageously conglomerates its own reply and replies from the downstream node(s) to reduce the number of separate transmissions required, and thus reduce bandwidth consumption and battery usage, for example. Yet, the given node advantageously does not wait for the given time to expire if the downstream node has already replied to the broadcast message, which may result in a significantly quicker return of the replies to the broadcast message.

Moreover, the given mobile node may maintain a route cache comprising a plurality of routes to at least one other mobile node in the MANET. The given mobile node may therefore select a desired route from among the plurality of routes for communications other than the conglomerated reply using round-robin route selection. That is, the given node may advantageously use round-robin route selection for "normal" communications, which advantageously distributes battery power and/or bandwidth consumption more evenly throughout the MANET, yet suspend the round-robin route selection for conglomerated replies to broadcast messages.

The given node may determine the given reply time based upon a number of wireless communications links along the route to the at least one downstream mobile node. More specifically, the given mobile node may maintain a route cache, and it may thus determine the number of wireless communications links along the route to the at least one downstream mobile node based upon the route cache. The given mobile node may monitor communications of at least one neighboring mobile node to determine sending of the reply from the at least one downstream mobile node. That is, the given mobile node may listen to communications of its neighboring mobile node(s) to determine whether the downstream mobile node(s) has replied to the neighbor node, in which case the given mobile node no longer needs to wait to send its own reply since it will not have to conglomerate its reply with that of the downstream mobile node(s)

The given mobile node may advantageously determine duplicate broadcast messages, and discard the duplicate broadcast messages without forwarding to the downstream mobile node to provide further efficiencies and battery savings. The given mobile node may also suspend sending of other messages originated by the given mobile node upon receipt of the broadcast message. That is, the given mobile node may enter a responding state where it awaits replies from downstream nodes, and it may suspend sending its own messages while in this state. However, the given mobile node may advantageously relay other messages originated by other mobile nodes upon receipt of the broadcast message (i.e., when in the responding state). By way of example, the mobile nodes may communicate using a dynamic source routing (DSR) protocol.

The broadcast message may include a route request for discovering return routes for replies to the forwarded broadcast message. Moreover, the given mobile node may also request an acknowledgement receipt of the forwarded broadcast message from the at least one downstream mobile node, and forward the broadcast message to the at least one downstream mobile node again if the acknowledgement receipt is not received after a duration. In addition, the at least one downstream mobile node may send its reply to the broadcast message to the given mobile node with a suggested reply route, and the given mobile node may choose a desired reply route from among the suggested reply route and at least one alternate route.

A MANET node for use in a MANET comprising a plurality of mobile nodes and wireless communications links therebetween in accordance with the invention may include a wireless communications device and a controller connected thereto. The controller may be for receiving a broadcast message inviting replies from mobile nodes along a route in the MANET, forwarding the broadcast message to at least one downstream mobile node along the route, and waiting for the at least one downstream mobile node to reply based upon the forwarded broadcast message. The controller may also be for sending a reply to the broadcast message at the earlier of either the least one downstream mobile node sending a reply to the forwarded broadcast message or a given reply time expiring.

A method aspect of the invention is for communicating within a MANET comprising a plurality of mobile nodes and wireless communications links therebetween. The method may include broadcasting a broadcast message inviting replies from mobile nodes along a route in the MANET. Further, the method may also include, at a given mobile node along the route, receiving the broadcast message, forwarding the broadcast message to at least one downstream mobile node along the route, and waiting for the at least one downstream mobile node to reply based upon the forwarded broadcast message. At the given node, a reply may also be sent to the broadcast message at the earlier of either the at least one downstream mobile node sending a reply to the forwarded broadcast message or a given reply time expiring.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and willfully convey the scope of the invention to those skilled in the art. Like numbers refer to like elements throughout, and prime notation is used to indicate similar elements in alternate embodiments.

Figure 1:
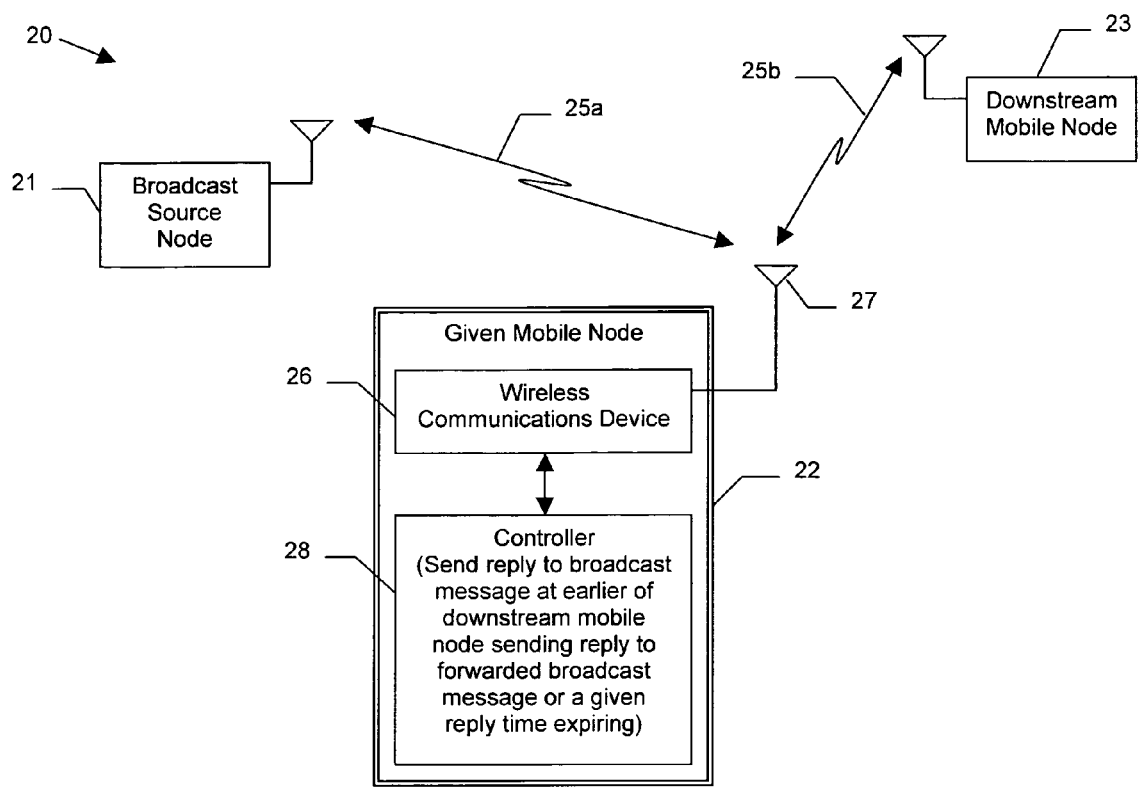
FIG. 1 is schematic block diagram of a mobile ad-hoc network (MANET) in accordance with the present invention.

Referring initially to FIG. 1, a mobile ad-hoc network (MANET) 20 in accordance with the present invention is first described. The MANET 20 illustratively includes a plurality of mobile nodes 21-23. A wireless communications link 25a is used for communications between the mobile nodes 21 and 22, and another wireless communications link 25b is used for communications between the mobile nodes 22 and 23. The wireless communications links 25a, 25b define a route from the mobile node 21 to the mobile node 23 which passes through the mobile node 22. Each wireless communications link in a MANET route is commonly referred to as a "hop," thus the illustrated route includes two hops. Various MANET protocols may be used in accordance with the present invention for establishing routing and governing communications traffic, including those described above.

The mobile node 22 illustratively includes a wireless communications device 26 (e.g., a radio frequency (RF) transceiver) and associated antenna 27, and a controller 28 connected to the wireless communications device. The mobile nodes 21 and 23 may include similar components which are not shown for clarity of illustration. As will be appreciated by those skilled in the art, MANET routes may include numerous hops, although only two hops are shown in FIG. 1 for clarity of illustration. Accordingly, the operations described herein with reference to the "given" mobile node 22 may also be performed by other nodes along a MANET route.

The broadcast source node 21, which may be a command/control platform, for example, may from time-to-time need to broadcast a broadcast message to all of the mobile nodes in the MANET 21. The broadcast message invites or requests all of the mobile nodes to send a reply which uniquely identifies its respective node. Typically, this is done by including a unique identification (ID) associated with each mobile node in the reply to the broadcast message. The reason for the broadcast message may be to determine the position/location of all the nodes, whether they are still active in the MANET, etc.

When the given mobile node 22 receives the broadcast message, it forwards the broadcast message to the downstream mobile node 23 along the route (i.e., via the wireless communications link 25b). As noted above, if the given mobile node 22 immediately replies to the broadcast source node 21, it will also later have to forward the reply from the downstream node 23 separately. This results not only in increased bandwidth utilization, but if the given mobile node 22 is battery powered then it causes extra drain on the battery as well.

Accordingly, the controller 28 therefore preferably waits for the downstream mobile node 23 to reply to the forwarded broadcast message before sending its own reply back to the broadcast source node 21. More particularly, the given mobile node 22 sends its reply to the broadcast message at the earlier of either the downstream mobile node 23 sending a reply to the forwarded broadcast message, or a given reply time expiring. The given reply time will typically be a maximum estimated time that it would take the downstream mobile node to generate a reply to the broadcast message if it is still active in the MANET 20. In other words, the given reply time would account for a maximum allowable device latency during high traffic periods, etc., to provide the downstream mobile node adequate time to reply. On the other hand, the reply time needs to be short enough so that an excessive wait does not occur if the downstream mobile node 23 is offline, out of communications range, etc.

Figure 2:
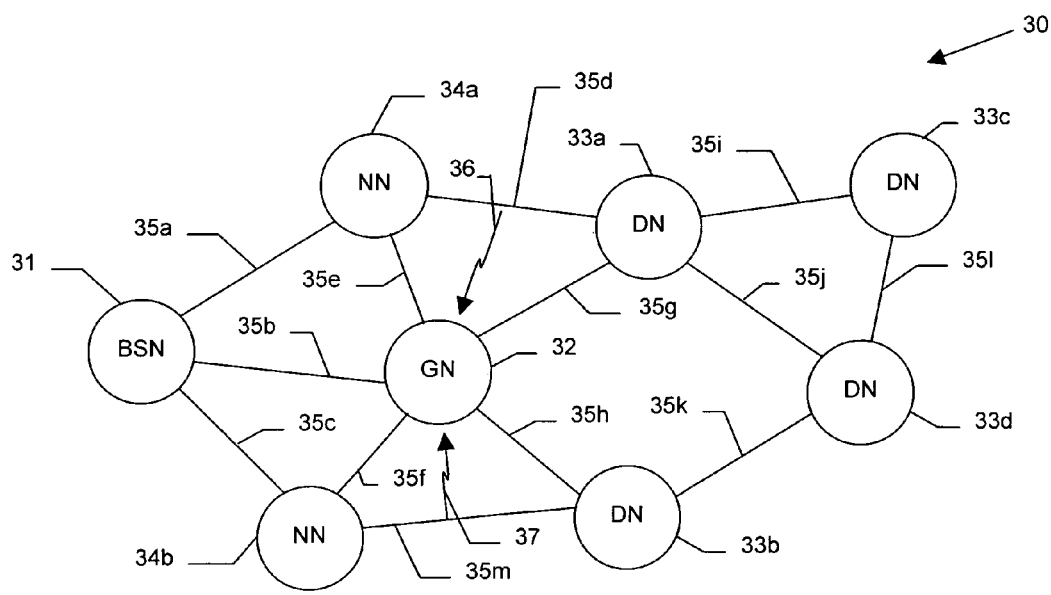
FIG. 2 is a schematic block diagram of another MANET in accordance with the present invention.
Figure 3:
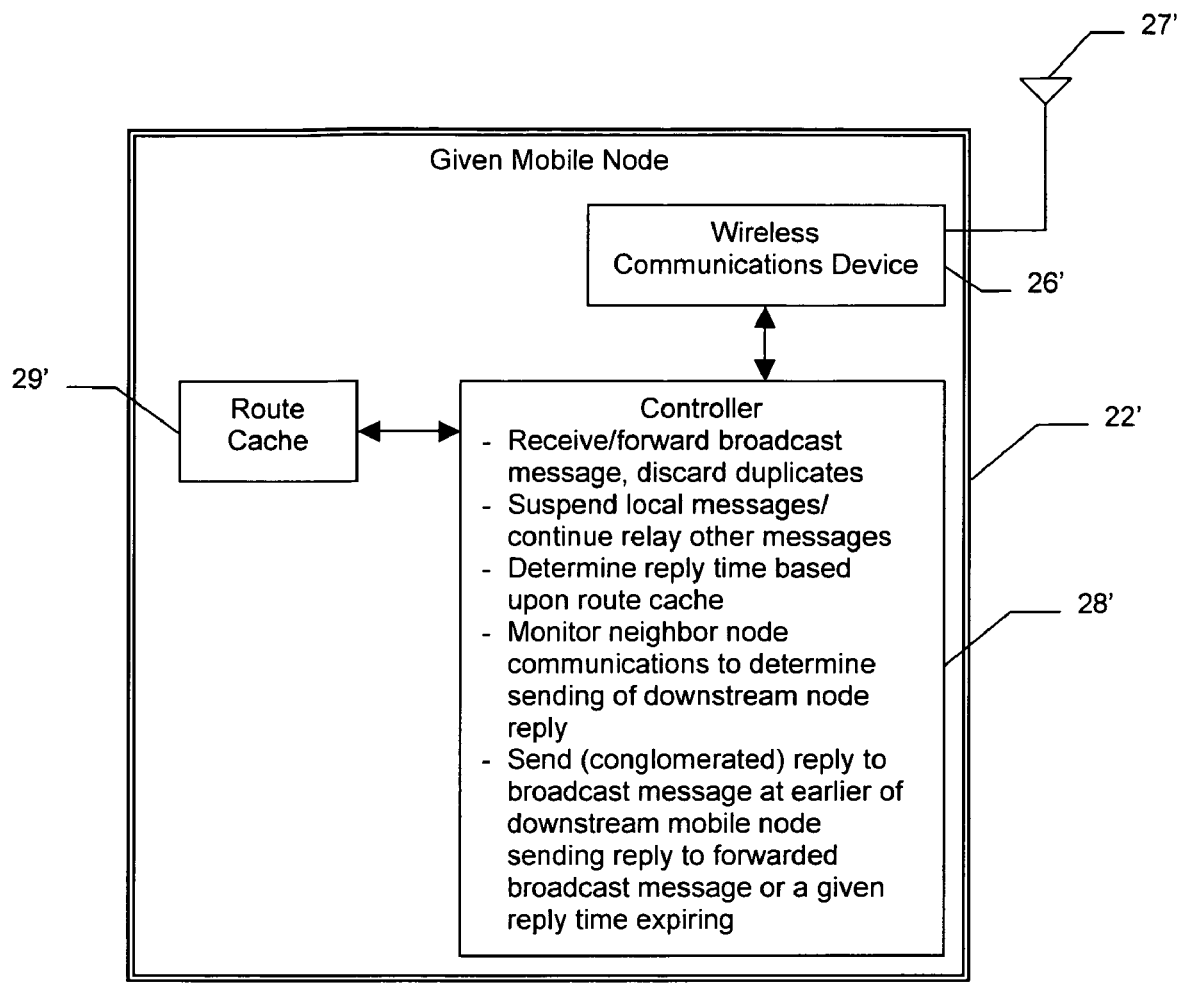
FIG. 3 is a schematic block diagram of an alternate embodiment of a mobile node of the MANET of FIG. 1.

Turning now additionally to FIGS. 2 and 3, a MANET 30 in accordance with the invention illustratively includes a broadcast source mobile node (BSN) 31, a given mobile node 32, downstream (DN) nodes 33a-33d, nodes 34a and 34b which are neighbors (NN) to the given mobile node, and wireless communications links 35a-35m between the nodes as shown. As will be appreciated by those skilled in the art, in the illustrated embodiment it is possible that a broadcast message may propagate along different routes from the broadcast source node 31 through the given node 32 and neighbor nodes 34a, 34b to the downstream nodes 33a-33d. Accordingly, it is also possible that replies to the broadcast message from the downstream nodes 33a-33d may not be routed through the given node 32. That is, these replies may instead be routed through either of the neighbor nodes 34a, 34b.

To provide bandwidth and battery power consumption savings, each of the given and neighbor nodes 32, 34a, 34b preferably waits a given reply time for broadcast message replies from the downstream nodes 33a-33d, and conglomerates any received replies with their own respective reply to send to the broadcast source node 31. Each of the given and neighbor nodes 32, 34a, 34b determines its respective given reply time (i.e., the maximum time it will wait for responses from the downstream nodes 33a-33c) based upon the routes it has stored in its respective routing cache 29' (FIG. 3). Yet, since the given node 32 advantageously does not wait for the given reply time to expire if the downstream nodes 33a-33d have already replied to the broadcast message, this may result in a significantly quicker return of the replies to the broadcast message.

By way of example, the given node 32 may determine from its route cache 29' that the downstream node the greatest or maximum number of hops away is the downstream node 33c. More particularly, the given node 32 has three potential routes to the downstream node 33c. The first route includes links 35g and 35i, the second route includes links 35g, 35j, and 35l, and the third route includes links 35h, 35k, and 35l. Accordingly, a conservative estimate for the given node 32 to receive replies from all of the downstream nodes 33a-33d may be the maximum number of hops (i.e., three) to the downstream node 33c multiplied by an expected maximum reply time associated with a single wireless communications link.

The per-link expected maximum reply time may be a standard value used by all of the nodes in the MANET 30, or it may be updated from time-to-time by different nodes based upon current network activity or usage, for example, as will be appreciated by those skilled in the art. Of course, it should be noted that other approaches for determining the reply time may also be used. Further details on the determination of reply times will be provided below.

Since there are multiple routes from the broadcast source node 31 to the downstream nodes 33a-33d, the replies from the downstream nodes to a broadcast message may go through any one of the given node 32 and neighbor nodes 34a, 34b. Accordingly, the given node 32 preferably not only keeps track of which downstream nodes 34a-34d it has received a reply for, but also whether the downstream nodes have returned a reply which has instead been routed through one of the neighbor nodes 34a, 34b. This may be done by monitoring communications of the neighboring nodes 34a, 34b, as schematically illustrated by arrows 36, 37, to determine sending of the replies from the downstream nodes 33a-33d.

In other words, the given mobile node 32 "listens" to communications of the neighboring nodes 34a, 34b to determine whether the downstream nodes 33a-33d have replied via the neighboring nodes. If so, the given mobile node 32 no longer needs to wait to send its own reply, and can advantageously send its reply prior to the expiration of the given reply time. It should be noted that in the illustrated example the downstream nodes 33a and 33b are not only downstream from the given node 32, but they are also neighboring nodes to the given node since they are within a single hop. Of course, neighboring nodes may be more than one hop away in certain implementations.

Another issue which may be encountered during propagation of the broadcast message through the MANET 30 is that a broadcast message may be received more than once by a mobile node. For example, the broadcast message may propagate by having each mobile node in the MANET 30 forward the broadcast message to all of its neighboring nodes (e.g., all nodes within one hop), except the neighboring node from which it received the broadcast message. In the case of the given node 32, for example, it will be appreciated that the broadcast message may be received not only from the broadcast source node 31, but also from the neighboring nodes 34a and 34b. Accordingly, the given mobile node 32 (and other mobile nodes in the MANET 30 as well) preferably determines duplicate broadcast messages, and discards the duplicate broadcast messages without forwarding to the downstream mobile node to provide further efficiencies and battery savings, as will be discussed further below.

The given mobile node may also suspend sending of other messages originated by the given mobile node 32 (i.e., locally originated messages) upon receipt of the broadcast message. That is, the given mobile node may enter a responding state where it awaits replies from the downstream nodes 33a-33d, and it may suspend sending its own messages while performing this function. However, the given node 32 may advantageously relay other messages originated by other mobile nodes upon receipt of the broadcast message (i.e., when in the responding state). As a result, network message traffic already in route when the broadcast message is received may advantageously still be delivered.

Figure 4:
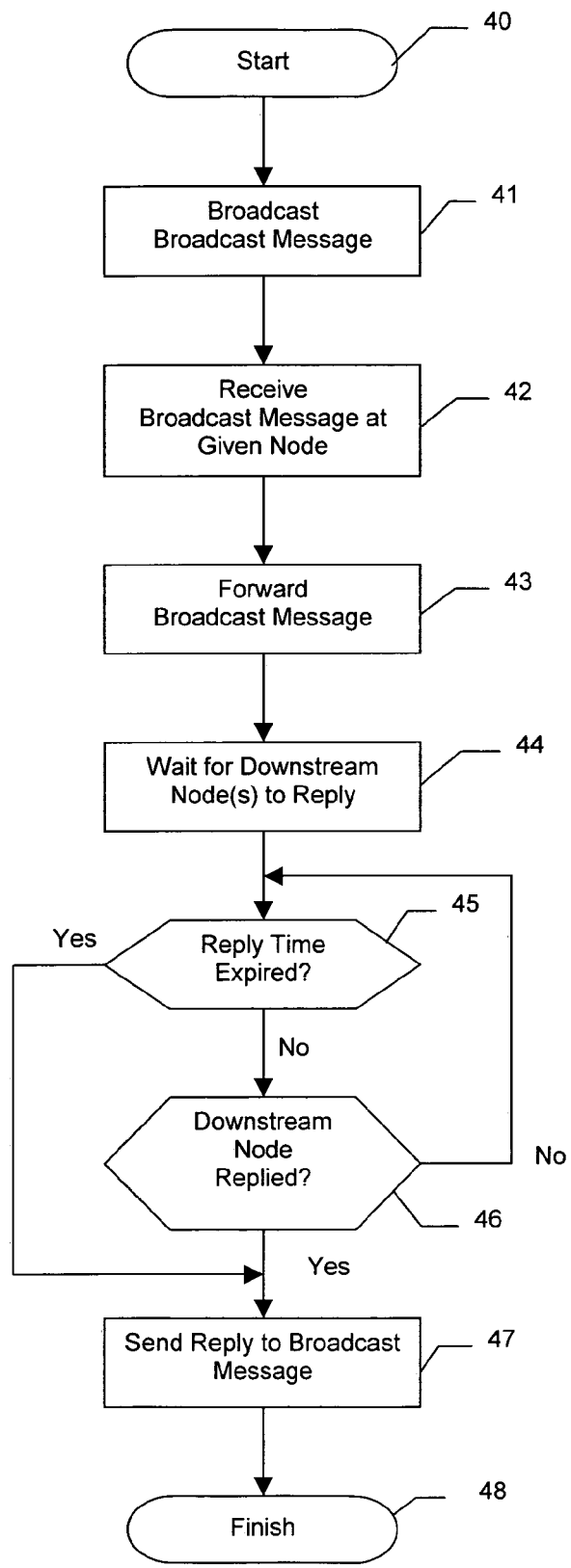
FIGS. 4 and 5 are flow diagrams illustrating method aspects of the present invention.

A method aspect of the invention for communicating within the MANET 20 is now described with reference to FIG. 4. Beginning at Block 40, a broadcast message inviting replies from mobile nodes 22, 23 is broadcast along the illustrated route in the MANET 20, at Block 41. Further, at the given node 22, the broadcast message is received (Block 42), forwarded to the downstream node 23 (Block 43), and the given node waits for the downstream node to reply based upon the forwarded broadcast message (Block 44). Further, at the given node 22, a reply is also sent to the broadcast message at the earlier of either the downstream node 23 sending a reply to the forwarded broadcast message, or a given reply time expiring, at Blocks 45-47, as discussed above, thus concluding the illustrated method (Block 48).

Figure 5:
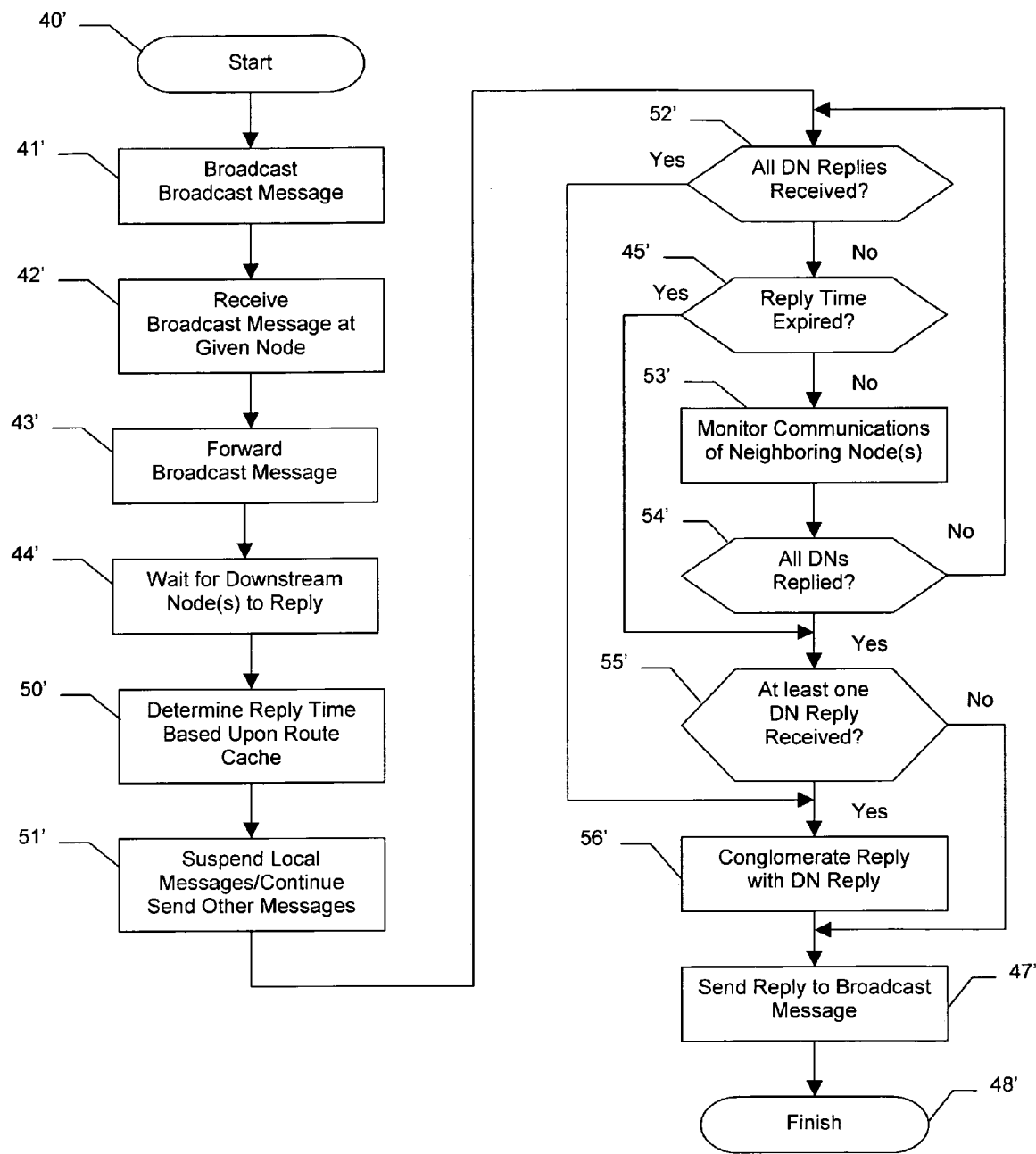

Additional method aspects of the invention are now described with reference to FIG. 5. At a given node 32 (see FIG. 2), the given reply time that the given mobile node will wait for replies from the downstream nodes 33a-33d is determined, at Block 50', and other messages originated by the given node (i.e., local messages) are suspended, at Block 51', while other messages originated from other nodes continue to be routed or sent as discussed above. It should be noted that these two steps may be performed in the opposite order. Moreover, while these steps are illustratively shown as occurring after forwarding of the broadcast message to downstream nodes 33a-33b (Block 43'), one or both of these steps may occur prior to forwarding, as will be appreciated by those skilled in the art.

As discussed above, the given node 32 may not always be the node through which replies from the downstream nodes 33a-33d are routed. However, if the given node 32 determines that it has received all of the replies from the downstream nodes 33a-33b, at Block 52', it may then proceed to conglomerate these replies with its own, at Block 56', and send the conglomerated reply (Block 47'). If this is not the case and the given reply time has not expired, at Block 45', then the given node 32 monitors communications of its neighboring nodes 34a, 34b to determine if all of the downstream nodes 33a-33d have replied, at Blocks 53' and 54'. If all of the downstream mobile nodes 33a-33d have replied, then the given node 32 determines if it has received at least one of the downstream node replies (Block 55'), and, if so, it proceeds to the conglomeration and sending steps illustrated at Blocks 56' and 47'. Otherwise, the given node 32 only sends its own reply to the broadcast source node 31 (Block 47'), as discussed above.

The invention will be further understood based upon the following description of an implementation thereof using DSR. Several terms which are used in this description are first defined for convenience of reference.

BASE_HOLD_OFF—a DSR value that represents the maximum time that a node could be in the responding state. The actual time spent in responding state may be less based upon the node's position in the network topology.

BlockingSends( )—the DSR operation that controls the transition of the node state through the flooding and responding states. Control is maintained through the set of state variables as described herein. The result of this operation is to prevent nodes from forwarding packets until the conditions occur.

Broadcast Flood—a one-to-all communication originating from a flood source. In multi-tier wireless LAN networks this requires that all nodes serve as repeaters sharing an equal responsibility to repeat the broadcast packet at least one time or multiple times if redundancy is required.

CurrentTime( )—a platform independent current system time on a particular node. This is not necessarily a common network time.

Data Conglomeration—the concatenation of multiple packets transmitted to a neighboring node via a single unicast transmission.

DoMacHdrRcv( )—an operation that processes overheard medium access control address (MACA) requests to send (RTS)/clear to send (CTS) exchanges between neighboring nodes and tracks successful link establishments. Link establishment information has a dual purpose in the DSR Router. It is used to monitor activity of back-tiered nodes while a forward node is still in the responding state. It is used to monitor neighbor interaction to differentiate between forward and lateral hops when link asymmetry exists in the network.

DSR Options—the DSR protocol options available for DSR peer-to-peer messaging. These options are as follows: Pad1, PadN, RtReq, RtRply, RtErr, AckReq, AckRply, SrcRt, and ExtHdr.

DSR Router—positioned in the network hierarchy between the IP and data link layers and is responsible for MAC layer routing by initiating peer-to-peer messaging between neighboring nodes. End-to-end messaging is accomplished by moving packets through a series of intermediate nodes acting as directed repeaters.

EXIT_FLOOD_DURATION—a time duration that represents the period of on-air silence required during the flooding state before a node can assume that the flooding has ended.

ExitFloodTime—this variable represents a future time that indicates when a node will move from the flooding State to responding State. It is calculated as the CurrentTime( )+EX- IT_FLOOD_DURATION upon receipt of any broadcast packets that contain a DSR RtReq or ExtHdr option with the latest broadcast identifier from the flood source.

Flood Source—identifies the node that initiated the broadcast flood. When it is the gateway, then a controlled flood/response process occurs. When it is not the gateway, then a simple flooding occurs without redundancy and without a coordinated response.

Flooding State—the time frame between when a node detects a new propagating broadcast from a gateway flood source and some brief interval following the time it detects the last rebroadcast of the flood packet.

Hop—a point-to-point direct wireless communications link between two neighboring nodes, which is one of many in a end-to-end path or route between two distant nodes.

Link Monitoring—a process whereby a node listens to neighboring nodes' MAC layer link in an effort to gain some knowledge of the link states between the neighboring nodes. This knowledge can be used to increase routing efficiency.

MACA Signaling—the MACA link layer handshaking that occurs when two neighboring nodes need to communicate. The handshake exchange occurs as follows for Node1 sending data to Node2.

| | |
|---|---|
| Node1 ... RTS ... → Node2 | |
| Node1 ← ... CTS ... Node2 | |
| Node1 ... DATA ... → Node2 | |
| Node1 ← ... DROP ... Node2 | |

Network Topology—a wireless mobile ad-hoc network is in constant flux as nodes move and as the RF propagation environment changes, making topology a fluid concept. Within a wireless ad-hoc fixed mobile command/control network, a more stable topology can emerge in relation to a special node that serves as a gateway to the command/control platform. In this respect, the network topology can be defined relative to outbound and inbound RF tiers between the gateway and the collection of LAN nodes. Each node will learn and maintain knowledge of its unique view of the topology by the exchange of DSR routing information. Topology is defined by characteristics such as routing depth, routing dimensions, routing direction, RF tiers, and link symmetry.

Responding State—the time frame between when a node leaves the flooding state and when it sends its response and forwards any other node responses it has received. How long a node is in the responding state is dependent upon its position in the network topology, as well as the state of any of the nodes that lie behind the node with directional respect to the flood source.

ResponseMaxHoldOff( )—a DSR support operation that derives a maximum ResponseTime for a node based upon a node's network topology characteristics.

ResponseTime—a DSR state variable that represents a future time that a node will release queued packets for transmission in response to a control platform initiated broadcast flood.

RF Tiers—a hierarchical relationship between network devices influenced by RF propagation properties that dictate RF ranges between nodes relative to a specific node in the wireless network. RF tiers play the predominant role in defining network topology. For example, from a gateway's perspective there could possibly be a different RF tier hierarchy for outbound transmissions than there is for transmissions inbound to the gateway. These properties can lead to an asymmetric network topology where a greater number of nodes fall within the transmission range of the gateway than the number of nodes that can themselves transmit to the gateway.

Round-Robin Route Selection—the mechanism for selecting routes in which routes are selected in an alternating fashion from those that are of least cost, greatest priority and of the desired or better quality level.

Route Cache—an array of route pool pointers indexed on destination addresses 1 ... BCASTADDR. When a route is learned to a new destination, a route pool is created and the route entry is made to the pool. For any subsequent routes learned, route entries are added to the previously created pool.

Route Favoring—the process of suspending round-robin selection to favor the previously selected route with the intent of promoting data conglomeration of multiple packets to the same next hop node.

Route Pool—a collection of alternate routes to a specific destination N.

RouteQueuedPkts( )—a DSR operation that removes packets from the RoutedPktsQ when the router is not in the responding state and routes the packet as indicated by the DSR header options present.

Routing Depth—a measure of distance in hops between a node and the gateway. Depth is representative of the shortest known path.

Routing Dimension—the breadth of different costs to route to a particular destination assuming only one pool route entry per immediate neighboring node. Each dimension represents a routing direction (toward, lateral, away) with respect to the particular destination.

Routing Direction—a concept that directionality can be assumed for each dimension based upon routing dimension. For example, if a route pool to a destination has three dimensions of routing of costs 3, 4 and 5 hops, then each of these dimensions could be associated with directional movement of toward, lateral and away, with respect to the destination.

RoutingPrediction—a DSR state variable that is initialized at the beginning of the responding state to contain a list of node addresses that are known to be positioned behind this node with respect to the flood source. These are the subset of nodes that are found to be in the third routing dimension.

RoutingReality—a DSR state variable that is a counter used to track how many nodes identified in the RoutingPrediction list are overheard transmitting packets to forward nodes. A node listens for MACA signaling to make this determination.

State—during a flood, a node will transition between the following states: idling-routing-flooding-responding-idling-routing-idling. While in idle, a packet is received that moves the DSR router to Routing. Once it determines that a broadcast flood is occurring the DSR router moves to the flooding state. As a nodes overhears other nodes repeat the broadcast flood, the node stays in the flooding state. Once the node detects through the absence of broadcast flood packets that the flood has ended, it determines triggers for its response and moves to the responding state. A node will move from the responding state to the idling state based on the occurrence of one of the two following conditions. If a position dependent hold off time expires, or if before this hold off time expires a node recognizes that all nodes known to be "behind" this node, with respect to the flood source, have transmitted their packets forward. When one of these conditions occurs, the DSR router will move to the idling state. Once the DSR router recognizes that it has packets to send/forward, it will move to the routing state. Finally the DSR router will move back to the idling state after the packets have been transmitted.

Symmetric/Asymmetric—refers to the link relationship between two nodes in the MANET. A symmetric link is one that is bi-directional where node A is in node B's range and node B is in node A's range. An asymmetric link is one that is uni-directional where node A is not in node B's range, but node B is in node A's range. MACA link establishment requires a symmetric relationship.

Unicast messaging—from an application level perspective this is a one-to-one message exchange possibly routed through a series of inter-node hops that may require multiple link establishments while in route.

The following description assumes that a control platform initiates a broadcast packet that needs to be propagated to all nodes in a wireless MANET via a gateway, and that each node must respond to this broadcast packet via a unicast response. The gateway broadcast packet includes a DSR header that contains a source address and broadcast identifier value pair. Together this value pair uniquely identifies a broadcast packet and helps control the flood of the packet across the wireless LAN.

The DSR header may include either a RtReq or ExtHdr option, each of which contains fields for the source address and broadcast identifier. The determinant used to indicate whether a RtReq or ExtHdr option is used is a time-based indicator called NextRefreshTime. The NextRefreshTime is calculated or re-calculated upon each gateway initiated broadcast flood that includes a RtReq option. The calculation can be represented as NRT=currentTime( )+NO_RE-FRESH_INTERVAL. The NO_REFRESH_INTERVAL value may be a hard value that is not modifiable. However, it may be desirable to make this duration tunable via a configuration parameter, for example, in some embodiments. An exemplary default for NO_REFRESH_INTERVAL is two minutes.

If a gateway initiated broadcast is to occur prior to the condition (currentTime( )=NextRefreshTime), then an ExtHdr option is used and no new routing information is distributed. Otherwise, a RtReq option is used which includes distribution of new routing information. Preferably, only one gateway-originated flood/response is active at a given time.

Control of the broadcast flood involves recognition of the following occurrences at each node: recognizing a new broadcast flood packet; recognizing duplicate broadcast flood packets; recognizing an acknowledgement of broadcast packet; recognizing when to resend a broadcast flood packet when acknowledgement is absent; and recognizing when the broadcast flood is over. The source address and broadcast identifier pair described above are used to address recognizing a new broadcast flood packet and recognizing duplicate broadcast flood packets. Recognition of an acknowledgement of a broadcast packet is addressed by the use of the AckRply option sent in the DSR header.

The AckRply option includes a list of addresses that represent each node from which the sending node heard the original and any subsequent duplicates of the latest broadcast flood packet. An AckRply option is included with any broadcast packets sent during a gateway initiated broadcast flood. Nodes receiving these AckRply options can scan the node list for their address. If their address is present in the list, then their re-broadcast has been acknowledged and they need not re-repeat this packet.

Repeat broadcasts by a node for redundancy are controlled by a retry counter BcastAwaitingAck[i].retries and retry timer BcastAwaitingAck[i].timestamp set within the DoPk-tAck( ) operation, which confirms the sending of a broadcast packet. However, sending does not confirm that other nodes received the packet. Collisions could prevent this broadcast from being successfully received by other nodes. The BcastAwaitingAck[i].retries counter starts at zero and is incremented by one for each resend until an acknowledgement is received, or until BcastAwaitingAck[i].retries exceeds the MAX_BCAST_RETRIES ceiling. The maximum number of retries may be defined as a hard value that is not modifiable in real-time. However, the retry ceiling may also be tunable via a configuration parameter, for example. An exemplary hard default for MAX_BCAST_RETRIES is one, although other values may be used as well. The BcastAwaitingAck[i].timestamp also gets reset in DoPk-tAck( ) according to the following calculation: BAAT=currentTime( )+AWAITING_ACK_DURATION. AWAITING_ACK_DURATION may be a hard value, or it may be configurable as well.

In the DSR draft specification entitled "The Dynamic Source Routing Protocol for Mobile Ad Hoc Networks (DSR)" from the IETF MANET Working Group, published Jul. 19, 2004, which is hereby incorporated herein in its entirety by reference, it is stated that before a broadcast is repeated, a small random jitter time should be imposed at each node to help avoid broadcast collisions. While the introduction of such a jitter is not discussed further herein, it will be appreciated that such jitter may be implemented in certain embodiments, if desired.

The steps outlined below describe how all nodes recognize the end of a gateway initiated broadcast flood and begin a coordinated effort to send their responses to the control platform. This coordinated effort is intended to minimize transmissions, and therefore conserve bandwidth and battery power. The coordinated response will result in a wave of conglomerated packets starting from the back-tiered (i.e., downstream) nodes moving toward the control platform. In a best-case scenario, this response wave would require a single unicast transmission from all nodes in the MANET.

During the broadcast flood, each node maintains a moving time marker called ExitFloodTime, which indicates a future time when the broadcast flood may compete for that node. On each node, the ExitFloodTime is calculated or re-calculated to a value EFT=currentTime( )+EXIT_FLOOD_DURATION whenever a DSR header is received that contains the latest gateway generated broadcast identifier. For example, if all nodes in receive (RX) range of the gateway detect a propagating broadcast they will initialize their ExitFloodTime to EFT, and each node will attempt, in turn, to repeat this broadcast packet upon initial receipt.

As more distant nodes hear this packet for the first time or as neighboring nodes hear repeated occurrences, they will calculate or re-calculate their ExitFloodTime using equation EFT. This will have the effect of pushing out the ExitFloodTime on all nodes until the flood ends. As an example for a particular node, if its first detection of a broadcast flood packet is at t0, its ExitFloodTime would be set to t0' using the above-noted EFT equation. At each subsequent receipt of this broadcast packet at times t1 through tN, the respective adjusted ExitFloodTime values would be t1' through tN' at each time calculated again using equation EFT. When no other broadcast packets are detected, each node's system time will eventually reach its ExitFloodTime.

The ExitFloodTime value is adjusted in either the ProcessRtReq( ) or ProcessExtHdr( ) operations since this is where the source address and broadcast identifier reside. Throughout the activities described above the node will be in a Flooding state, which also causes the node to postpone sending any packets generated locally from the node's application layer while still allowing routed packets to propagate. This prevents nodes from sending application responses to the broadcast packet while in the flooding state, and it is controlled by the Boolean operation BlockingSends( ). Exit from the flooding state may not happen on all nodes at the same time. Forward positioned nodes with respect to the gateway may exit the flood state sooner than those nodes toward the back tiers.

Once a node exits the flooding state it moves to the responding state. At this time it uses information in its route cache to make a determination as to its position in the network relative to the flood source. If the flood was controlled by a RtReq, then the routing information will be new as a result of the RtReq flood. If the flood was controlled by a ExtHdr, then the routing information will be from a previous RtReq flood. To determine a node's position in the network a scan of the route pool to the flood source is done to determine each node's routing depth and routing dimensions.

While a node is in the responding state, all packets either being originated or routed from the responding node are held in a queue until the time the node exits the responding state. Control of this hold off is accomplished in operations BlockingSends( ) and RouteQueuedPkts( ) in checks for the responding state.

Once depth and dimension are determined, each node uses this information to derive some knowledge of its position in the network topology relative to the flood source and its neighboring nodes. Depth identifies a node's shortest distance from the flood source measured in hops. Dimension helps identify the position of a node relative to its neighboring nodes with respect to the flood source. This in essence associates a routing direction with each neighboring node with respect to the flood source.

By way of example, nodes that have three dimensions can assume positioning in the middle or front of the network topology with three routing directions through neighbors toward, lateral, or back relative to the flood source. Nodes that have only two dimensions can assume positioning in the last tier within the network topology with only two routing directions through neighbors toward and lateral relative to the flood source. These rules assume symmetric RF characteristics exists between all nodes, although asymmetric characteristics may be present in other embodiments.

Next, nodes will use their relative position knowledge to calculate a worst case ResponseTime based upon the calculation RT=currentTime( )+ResponseMaxHoldOff( ). The function ResponseMaxHoldOff( ) adjusts a BASE_HOLD_OFF duration sensitive to routing depth and dimension so that nodes in the forward tiers having less depth, and three dimensions of routing will result in having longer ResponseMaxHoldOff( ) delay than nodes toward the back tiers. Nodes having only two dimensions of routing and greater depth with respect to the flood source will have a very short to no ResponseMaxHoldOff( ) delay. This will ensure that nodes in the farthest tier from the flood source will begin the response wave back toward the flood source fairly quickly.

ResponseTime is a topology sensitive maximum delay that a node may incur before transmitting packets that have accumulated in its send and routed queues while it is in the responding state. Another trigger point that can cause a node to respond is described below. The ResponseTime trigger is checked in the BlockingSends( ) operation. BASE_HOLD_OFF may be a hard value, or it may be a configurable variable with a hard value as a default, for example.

While the time gap between CurrentTime( ) and ResponseTime trigger becomes lesser on each successive node, those that have at least three routing dimensions will investigate their route cache to determine which of its neighboring nodes lie behind (i.e., downstream) with respect to the flood source. This is accomplished by scanning the route pool to the flood source for routes having a cost equal to the third dimension routing cost and maintaining a list of these node addresses. Each node after compiling this list locally will prepare to monitor link layer traffic to recognize when these neighboring nodes complete packet transmissions. This will help the monitoring node determine when it can leave the responding state and begin to release its queued packets.

Moreover, this will also allow a node to recognize when known back nodes have transmitted their data and when it has become a back-tiered node. The list is maintained in a path object called RoutingPrediction that also has a count associated with it. This provides a mechanism to short circuit the maximum ResponseTime trigger described above. The ResponseTime trigger serves as a protection mechanism should the node fail to detect some neighboring node transmissions.

Next, any node that determines that it is positioned in the farthest tier from the flood source will move from the responding state to the idling state after little or no delay, as determined by ResponseMaxHoldOff( ) on these nodes. Once the DSR router recognizes that there is a packet to send, the DSR router will transition to the routing state and begin to send the response data via the shortest routes selected from the node's route cache. If there are multiple packets queued for a common destination, the same route should be selected for these packets, as will be discussed further below.

Each forward tier node will monitor node-to-node MACA signaling to track which of the back tier nodes identified in RoutingPrediction list transmitted their response packets forward. Each will maintain this knowledge using a counter called RoutingReality. This count is maintained within the DoMacHdrRcv( ) operation.

A forward node will determine its time to respond based upon the positive outcome of at least one of the following two conditions: (1) the local node's ResponseTime (as determined above) has been met or exceeded; and (2) the local node's back tier neighbors (as identified above) have all forwarded their (possibly conglomerated) responses as recognized by link monitoring, as described above. This happens when the length of the RoutingPrediction list equals the RoutingReality count accumulated while in the responding state. These trigger checks occur in the BlockingSends( ) operation.

Additionally, when a local node determines that it should leave the responding state and transmit any reply packets it has held back in its queues, the local node selects a common route for each forwarding packet to the flood source so that these packets may be considered for data conglomeration by the underlying link layer protocol. If a round-robin route selection algorithm is being used, it should be suspended to favor a single route (i.e., route favoring) for the multiple packets that may reside on the local node being routed to the same destination.

The result of the above-described approach will be a wave pattern of response data beginning with the farthest back tiered nodes that successively moves forward toward the control platform, with each forward node conglomerating data responses together to minimize the network cumulative channel access. A best-case scenario would result in each node initiating only a single unicast message containing a conglomeration of packets that includes its response packets plus packets being forwarded from back tier nodes. The above-described approach is not only relatively simple to implement, it may also be implemented without additional or special hardware. Moreover, this approach advantageously complements, rather than competes with, many other approaches for conserving battery life, as will be appreciated by those skilled in the art.

DSR typically uses strict source routing (SSR), which is a source routing method in which each node that routes a packet according to a source route path strictly adheres to the source route path provided in the routing protocol. The nodes which appear in the source route list are the only nodes visited, and in the order listed. This is the prescribed routing mechanism for DSR as documented by the IETF.

In accordance with the invention, "loose source routing" (LSR) may also be used in addition to SSR, which means that the nodes in the source list should be visited, but their may be other nodes visited that do not appear in the source list. For example, the list might identify major gateways between two points but not identify specific paths between these gateways. Loose source routing may also mean that the source route as indicated is only a suggested route, but that intermediate node decisions can be made that change the routes hops. That is, an originating source route of (8, 4, 2, 1) may be changed to (6, 5, 3, 1) or (8, 4, 3, 1) based on intermediate node decisions about what is the best next hop along the route from source to destination. This mechanism allows packets being routed back to the gateway to better distribute the power and/or traffic load across multiple next hop choices as well as maintaining more current link status on each next hop option. This is done by allowing a local node to round-robin through the next hop options it has in its route cache for a particular destination. This also provides a mechanism whereby invalid source routes can be repaired as the Route Reply moves through the network back to the gateway.

Zeroing an SSR bit in the Source Route's reserved field can turn on (or off) LSR. Non-gateway nodes may initiate source-routed packets using the LSR option, and a gateway node may initiate source-routed packets using the SSR option, for example.

Broadcast flooding is the process of propagating a broadcast message to all network nodes. A node, for example, "re-fires" (i.e., forwards again) the broadcast propagation some configurable number of times, or until it receives some confirmation that another node has received one of its broadcast propagations. This confirmation will be done via a broadcast acknowledgment described below. A wait period or duration will elapse between re-broadcasts to give the node an opportunity to hear an acknowledgement. Broadcast flooding provides a best effort delivery mechanism that attempts to assure that each node's forwarding of the original broadcast message was received by another node. A node will repeat the message upon initial receipt, and will then filter out any subsequent messages it hears. However, it will collect routing information from duplicate messages as well as maintain a list of nodes from which it heard the duplicates.

Broadcast acknowledgement is a process by which a node that receives and propagates a broadcast packet will include in its propagation message a DSR acknowledgement to any nodes from which this node received the original and any duplicates of the broadcast packet. This acknowledgement will allow the acknowledged nodes to suppress any re-firings of this broadcast packet. A gateway node will issue a special broadcast acknowledgement referred to as the "post flood acknowledgement." This acknowledgement is issued by the gateway after it detects that the flood out has subsided. The post flood ACK will include a broadcast acknowledgement that will list all the tier-1 nodes that the gateway heard rebroadcast its message that initiated the flooding. Each node that hears this can then use the information to confirm whether its rebroadcast was heard by the gateway, thereby implicitly confirming its direct link. Nodes that hear this post flood acknowledgement that do not find their address in the acknowledgement list can assume they do not have a direct link to the gateway. Nodes can use the list to deduce other link information that can be used to further groom their route cache entries.

The above-noted MACA link monitoring process will now be described in further detail. The DSR router will register with the MACA layer to receive notifications of MACA handshake exchanges between neighboring nodes. The DSR router will maintain the link state between each pair of nodes that interact. DSR will use this information for two purposes. One will be to determine when a node should respond during the flood response process, and the other will be to help in converging routes to a shortest path during the flood response process.

First, control of when a node responds during the flood response process is discussed. Following the flooding process each node has knowledge about what next hop nodes are a backward, lateral, or forward movement with respect to the gateway/flood source. The list of nodes that represent backward movement identify the nodes in a back tier of which the local node is within transmission range. If the local node monitors link establishment attempts (RTS/CTS) between these back tier nodes and nodes that are lateral to the local node, the local node can determine when nodes in the back tier have all had a chance to move their packets forward toward the gateway.

Once this has occurred, the local node can assume the forward moving wave has arrived at its tier level and that all nodes in the local node tier will begin to send packets down the stack for transmission to move them forward to the next tier toward the gateway. In this scenario, MACA monitoring is used to detect when nodes known to be behind (i.e., downstream from) the local node have all delivered their payload forward.

The second advantage gained from MACA monitoring occurs during the response phase of a flood/response activity. During a flood/response in a network layout with asymmetric properties, MACA monitoring may be used by a node to differentiate between forward and lateral next hop routes that have the same cost introduced during the flood phase within a network layout that has asymmetric link properties. A node can differentiate between these next hop routes by comparing overheard link establishment communications with known information about costs in its local route cache. Using this information, a node may adjust the priority metric of a route entry to differentiate it from other route entries of the same cost.

By way of example, assume we have a four-tier layout with the gateway broadcast capable of projecting out three tiers. Following the flood out, the nodes in each tier would have the knowledge of route cost and priority outlined in Table 1, below.

TABLE 1

| Post Flood Route Cache State | | | | |
|---|---|---|---|---|
| Gateway | Tier-1 | Tier-2 | Tier-3 | Tier-4 |
| Cost | 1, 2 | 1, 2 | 1, 2, 3 | 2, 3 |
| Priority | N | N | N | N |

Table 1 illustrates that nodes in tier-1, tier-2 and tier-3 include routing information that indicates direct links to the gateway. Only the tier-1 nodes would truly have direct links. Nodes in tier-1 would have route entries that are a cost of two hops, some of which would be through other tier-1 nodes and others through tier-2 nodes. In this case, cost alone does not differentiate between lateral and backward routes. This hold true as well with tier-2, which includes route entries with a cost of 2 with next hop nodes belonging to tier-1, tier-2 and tier-3. Tier-2 then has an invalid direct link plus all other routes that measure equally based upon cost that are actually a combination of forward, lateral and backward routes. Tier-3 nodes also have an invalid direct link, and no differentiation between forward and lateral routes. However, tier-3 does know about backward routes. Tier-4, not hearing the gateway directly can clearly differentiate between forward and lateral routes and has no backward routes.

Following the flood-response back, the use of MACA monitoring nodes that overhear successful link establishments between a neighboring node and the gateway or flood source can increase the priority of the route entry through the neighboring node. Also, nodes that overhear successful link establishment between neighboring nodes belonging to backward moving source routes may decrease the priority of the route entry of the route containing the destination of the overheard link attempt. That is, if node X overhears node N send a RTS to node M and node M sends a CTS back, and node X determines that node N is a backward moving route based on cost, then node X can decrease the priority of its route containing node M, since it can now be determined that M is a lateral move. Following the response wave forward, the nodes in each tier would have the following adjusted knowledge of route cost and priority.

TABLE 2

| | Post Response Route Cache State | | | |
|---|---|---|---|---|
| Gateway | Tier-1 | Tier-2 | Tier-3 | Tier-4 |
| Cost | 1, 2 | 2 | 2, 3 | 2, 3 |
| Priority | N, N + 1, N | N, N + 1 | N − 1, N | N |

Table 2 illustrates that nodes in tier-1 have routes that are a cost/priority combination of 1/N, 2/N+1, 2/N. Tier-2 nodes have routes with a cost/priority combination of 2/N and 2/N+1. Tier-3 nodes have route cost/priority combinations of 2/N-1, 2/N and 3/N. The resultant routes in Table 2 provide each node with the ability to differentiate between forward, lateral and backward routes based upon the combination of route cost and route priority.

When a node has a packet that it needs to send to a specific destination, it can select a route from the multiple options that may exist in the route cache. Route selection has to do with how to determine which route from the various options to choose at a particular time. For normal traffic (i.e., non-broadcast message traffic), selection of routes is preferably done on a round-robin basis. A round-robin scheme has two significant benefits. One is that it contributes to power usage distribution by utilizing all next hop nodes over time so one node does not become overused. The second benefit is that alternate routes in the cache are not allowed to become stale. They will be used periodically thereby confirming their current "health."

However, when there are multiple packets to send to the same destination (i.e., conglomerated broadcast message replies), then the round-robin algorithm is suspended and each of the packets is given the same next hop route. This mechanism is referred to as "route favoring." This helps accommodate the underlying subnet packet conglomeration mechanisms implemented to help conserve on-air transmission time. Once the multiple packets have been queued, conglomerated and sent, the round-robin selection will resume until the node in question once again has multiple packets to forward to the next destination.

The loose source routing mechanism described above will allow round-robin selection to occur at each intermediate hop along a source path. For a packet that is being loose source routed, the local node will query the route cache for the next available route that will be inserted into the source route as the next hop node replacing whatever next hop node was previously in the suggested source route option.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A mobile ad-hoc network (MANET) comprising:
a plurality of mobile nodes and wireless communications links therebetween;
a given mobile node along a route in the MANET for receiving a broadcast message inviting replies from mobile nodes along the route,
forwarding the broadcast message to at least one downstream mobile node along the route,
waiting for said at least one downstream mobile node to reply based upon the forwarded broadcast message, and
sending a reply to the broadcast message at the earlier of either said at least one downstream mobile node sending a reply to the forwarded broadcast message or a given reply time expiring,
wherein the reply from said given mobile node comprises a conglomerated reply if said given mobile node has received the reply from said at least one downstream mobile node.

2. The MANET of claim 1 wherein said given mobile node determines the given reply time based upon a number of wireless communications links along the route to said at least one downstream mobile node.

3. The MANET of claim 2 wherein said given mobile node further maintains a route cache, and determines the number of wireless communications links along the route to said at least one downstream mobile node based upon the route cache.

4. The MANET of claim 1 wherein said given mobile node monitors communications of at least one neighboring mobile node to determine sending of the reply from said at least one downstream mobile node.

5. The MANET of claim 1 wherein said given mobile node determines duplicate broadcast messages, and discards the duplicate broadcast messages without forwarding to said at least one downstream mobile node.

6. The MANET of claim 1 wherein said given mobile node suspends sending of other messages originated by said given mobile node upon receipt of the broadcast message.

7. The MANET of claim 1 wherein said given mobile node relays other messages originated by other mobile nodes upon receipt of the broadcast message.

8. The MANET of claim 1 wherein said mobile nodes communicate using a dynamic source routing (DSR) protocol.

9. The MANET of claim 1 wherein the broadcast message further comprises a route request for discovering return routes for replies to the forwarded broadcast message.

10. The MANET of claim 1 wherein said given node also requests an acknowledgement receipt of the forwarded broadcast message from said at least one downstream mobile node, and forwards the broadcast message to said at least one downstream mobile node again if the acknowledgement receipt is not received after a duration.

11. The MANET of claim 1 wherein said at least one downstream mobile node sends its reply to the broadcast message to said given mobile node with a suggested reply route, and wherein said given mobile node chooses a desired reply route from among the suggested reply route and at least one alternate route.

12. A mobile ad-hoc network (MANET) comprising:
a plurality of mobile nodes and wireless communications links therebetween; and
a broadcast source node for broadcasting a broadcast message inviting replies from mobile nodes along a route in the MANET;
a given mobile node along the route for receiving the broadcast message,
    forwarding the broadcast message to at least one downstream mobile node along the route,
    waiting for said at least one downstream mobile node to reply based upon the forwarded broadcast message,
    determining a given reply time based upon a number of wireless communications links along the route to said at least one downstream mobile node, and
    sending a reply to the broadcast message at the earlier of either said at least one downstream mobile node sending a reply to the forwarded broadcast message or a given reply time expiring, the reply comprising a conglomerated reply if said given mobile node has received the reply from said at least one downstream mobile node.

13. The MANET of claim 12 wherein said given mobile node further maintains a route cache, arid determines the number of wireless communications links along the route to said at least one downstream mobile node based upon the route cache.

14. The MANET of claim 12 wherein said given mobile node monitors communications of at least one neighboring mobile node to determine sending of the reply from said at least one downstream mobile node.

15. The MANET of claim 12 wherein said given mobile node determines duplicate broadcast messages, and discards the duplicate broadcast messages without forwarding to said at least one downstream mobile node.

16. The MANET of claim 12 wherein said given mobile node suspends sending of other messages originated by said given mobile node upon receipt of the broadcast message.

17. The MANET of claim 12 wherein said given mobile node relays other messages originated by other mobile nodes upon receipt of the broadcast message.

18. The MANET of claim 12 wherein said mobile nodes communicate using a dynamic source routing (DSR) protocol.

19. A mobile ad-hoc network (MANET) comprising:
a plurality of mobile nodes and wireless communications links therebetween;
a given mobile node along a route in the MANET for
    receiving a broadcast message inviting replies from mobile nodes along the route,
    forwarding the broadcast message to at least one downstream mobile node along the route,
    waiting for said at least one downstream mobile node to reply based upon the forwarded broadcast message, and
    sending a conglomerated reply to the broadcast message comprising the reply from said at least one downstream mobile node;
    said given mobile node maintaining a route cache comprising a plurality of routes to at least one other mobile node in the MANET, and selecting a desired route for communications not including the conglomerated reply from among the plurality of routes using round-robin route selection.

20. The MANET of claim 19 wherein said given mobile node determines duplicate broadcast messages, and discards the duplicate broadcast messages without forwarding to said at least one downstream mobile node.

21. The MANET of claim 19 wherein said given mobile node suspends sending of other messages originated by said given mobile node upon receipt of the broadcast message.

22. The MANET of claim 19 wherein said given mobile node relays other messages originated by other mobile nodes upon receipt of the broadcast message.

23. The MANET of claim 19 wherein said mobile nodes communicate using a dynamic source routing (DSR) protocol.

24. A mobile ad-hoc network (MANET) node for use in a MANET comprising a plurality of mobile nodes and wireless communications links therebetween, said MANET node comprising:
a wireless communications device; and
a controller connected to said wireless communications device for
    receiving a broadcast message inviting replies from mobile nodes along a route in the MANET,
    forwarding the broadcast message to at least one downstream mobile node along the route,
    waiting for the at least one downstream mobile node to reply based upon the forwarded broadcast message, and
    sending a reply to the broadcast message at the earlier of either the least one downstream mobile node sending a reply to the forwarded broadcast message or a given reply time expiring, the reply comprising a conglomerated reply if the reply from the at least one downstream mobile node has been received.

25. The MANET node of claim 24 wherein said controller determines the given reply time based upon a number of wireless communications links along the route between to the at least one downstream mobile node.

26. The MANET node of claim 25 wherein said controller further maintains a route cache, and determines the number of wireless communications links along the route to the at least one downstream mobile node based upon the route cache.

27. The MANET node of claim 24 wherein said controller monitors communications of at least one neighboring mobile node to determine sending of the reply from the at least one downstream mobile node.

28. The MANET node of claim 24 wherein said controller determines duplicate broadcast messages, and discards the duplicate broadcast messages without forwarding to the at least one downstream mobile node.

29. The MANET node of claim 24 wherein said controller suspends sending of other messages originated by said controller upon receipt of the broadcast message.

30. The MANET node of claim 24 wherein said controller relays other messages originated by other mobile nodes upon receipt of the broadcast message.

31. A method for communicating within a mobile ad-hoc network (MANET) comprising a plurality of mobile nodes and wireless communications links therebetween, the method comprising:
broadcasting a broadcast message inviting replies from mobile nodes along a route in the MANET; and at a given mobile node along the route
- receiving the broadcast message,
- forwarding the broadcast message to at least one downstream mobile node along the route,
- waiting for the at least one downstream mobile node to reply based upon the forwarded broadcast message, and
- sending a reply to the broadcast message at the earlier of either the at least one downstream mobile node sending a reply to the forwarded broadcast message or a given reply time expiring, the reply comprising a conglomerated reply if the given mobile node has received the reply from the at least one downstream mobile node.

32. The method of claim 31 further comprising, at the given mobile node, maintaining a route cache comprising a plurality of routes to at least one other mobile node in the MANET, and selecting a desired route from among the plurality of routes for communications other than the conglomerated reply using round-robin route selection.

33. The method of claim 31 further comprising determining the given reply time based upon a number of wireless communications links along the route to the at least one downstream mobile node.

34. The method of claim 33 further comprising, at the given mobile node, maintaining a route cache; and wherein the given mobile node determines the number of wireless communications links along the route to the at least one downstream mobile node based upon the route cache.

35. The method of claim 31 further comprising, at the given node, monitoring communications of at least one neighboring mobile node to determine sending of the reply front the at least one downstream mobile node.

36. The method of claim 31 further comprising, at the given mobile node, determining duplicate broadcast messages, and discarding the duplicate broadcast messages without forwarding to the at least one downstream mobile node.

37. The method of claim 31 further comprising, at the given mobile node, suspending sending of other messages originated by the given mobile node upon receipt of the broadcast message.

38. The method of claim 31 further comprising, at the given mobile node, relaying other messages originated by other mobile nodes upon receipt of the broadcast message.

\* \* \* \* \*